May 31, 1932.    R. G. THOMPSON    1,860,635
TAPE MEASURE HOOK
Filed Aug. 25, 1930

INVENTOR
ROBERT G. THOMPSON
BY George B. Wilcox
ATTORNEY

Patented May 31, 1932

1,860,635

UNITED STATES PATENT OFFICE

ROBERT G. THOMPSON, OF MONTCLAIR, NEW JERSEY, ASSIGNOR TO LUFKIN RULE COMPANY, OF SAGINAW, MICHIGAN, A CORPORATION OF MICHIGAN

TAPE MEASURE HOOK

Application filed August 25, 1930. Serial No. 477,646.

This invention relates to a tape measure having a pronged hook attached to its ring, the hook being foldable against the ring, or extensible at right angles to the ring, in known manner.

The improvement herein claimed pertains to a novel construction of the tape measure ring and of a co-operating hinge member or knuckle of the hook. The object of the invention is to provide a simple and inexpensive foldable hook for tape measure rings so arranged as to provide a positive stop to hold the hook rigidly at right angles to the ring when the tape measure is under tension, a means to releasably hold the hook at right angles to the ring so that it will not become displaced while the tape measure is being handled preparatory to using the hook for measuring purposes, and also a means for releasably holding the hook flat against the ring when the tape is to be used without using the hook.

A further object of my invention is to embody in the ring and in the tubular member all of the above-mentioned devices, namely, the positive stop member and the two releasable holding devices just mentioned.

In the drawings Fig. 1 is a face view of the end of a tape, showing the hook in its working position.

Figure 1:
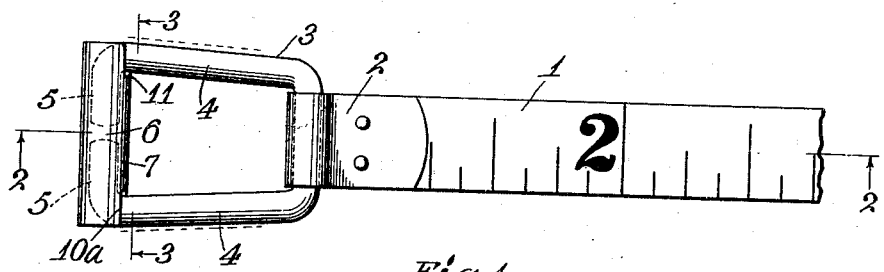

As is clearly shown in the drawings, tape 1 is provided with the usual clip 2 and ring 3.

My improved construction employs a tape measure ring having side members 4 made of spring material, so as to be spring actuated toward each other, their outer ends being shaped to present a pintle, preferably formed of two inwardly directed co-axial opposed pintle members 5, the ends of which are spaced apart as indicated at 6. A hook is hinged to the pintle, as is customary in hook-ended tapes, but this hook has its hinge constructed and arranged in a novel way to co-act with the spring ring for releasably holding the hook either in its extended position or in folded position on the ring.

Figure 4:
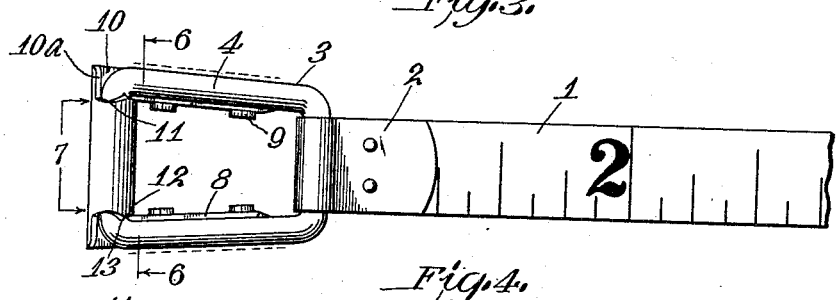
Fig. 4 is a face view of the tape, showing the hook in its folded position.
Figure 5:
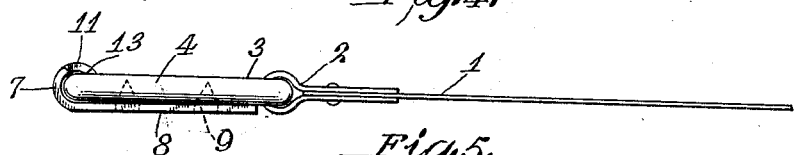
Fig. 5 is a side view of the parts shown in Fig. 4.

The hook, which is preferably made of sheet metal, consists of a tubular hinge knuckle 7 with one or more fingers projecting tangentially therefrom and provided with prongs. As illustrated herein the hook has two fingers, 8, of suitable size and arranged to permit their prongs 9 to stow snugly against the ring members 4 when the hook is folded, as shown in Figs. 4 and 5.

Figure 2:
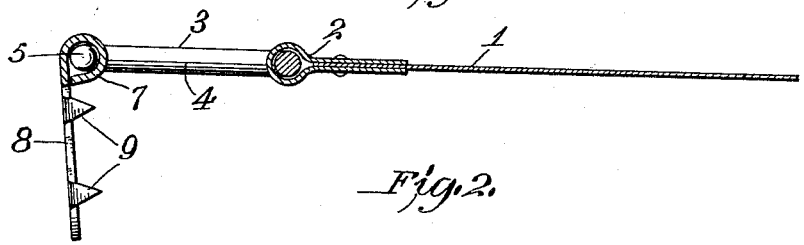
Fig. 2 is a sectional view on line 2—2 of Fig. 1.
Figures 3, 7, 8:
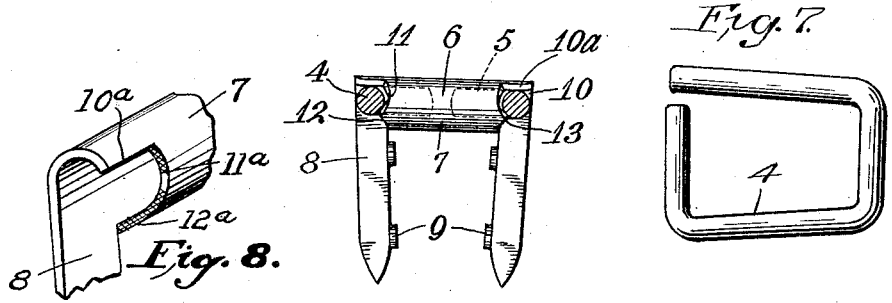
Fig. 3 is a transverse section on line 3—3 of Fig. 1.
Fig. 7 shows a modified form of the ring.
Fig. 8 is a fragmentary detail of another modified form of knuckle.

At least one end of tubular knuckle 7, preferably both, has a part-tubular extension 10 that presents a shoulder stop 10a projecting lengthwise and arranged to engage the top face of side member 4 of the ring when the hook is in the working position, shown in Figs. 2 and 3, so as to prevent backward rotation of the knuckle and to keep fingers 8 approximately perpendicular to the plane of ring 3 while the hook is engaged with the work and the tape is held taut.

The devices for releasably holding the hook in its down or working position and also for holding it in its folded position when not in use are associated with the knuckle 7 of the hook and the spring side members 4 as will now be explained.

Knuckle 7, being tubular, is shaped at its end to provide a releasable latching device which, in conjunction with the spring ring, constitutes the claimed subject-matter of this invention.

The body proper of knuckle 7 is long enough to keep the side members 4 sprung slightly outward. Consequently they normally press against the ends of the tubular knuckle. One or both of these tubular ends is shaped to provide a depression or socket 11 to receive and pocket the side member 4 of the ring when the hook is extended.

Figure 6:
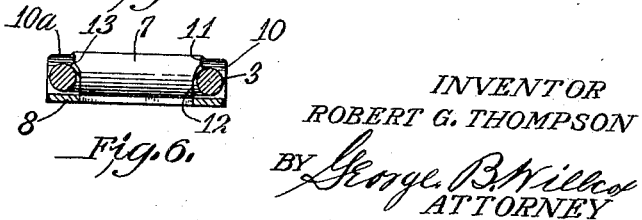
Fig. 6 is a transverse section on line 6—6 of Fig. 4.

Another similar socket 12 is provided to pocket the member 4 when the hook is folded against the ring as shown in Figs. 4 and 6. Between sockets 11 and 12 is a cam-like projection 13.

When the hook is in the act of being opened, that is, moved from its folded position to its working position, projection 13 rides over the inner face of side member 4, and in so doing springs it outward. Side member 4 which in its first position rested in socket 12, as shown in Fig. 4, thus rides up over cam 13 and snaps back into socket 11. Thereby the hook is held tightly against the side members 4 of the ring when folded against the ring and likewise when extended to its working position. In this latter position the hook is additionally held by means of the stop 10a, preventing its displacement by forces such as are employed in tensioning the tape.

While I have shown and described the invention as embodied in a ring having its outer ends bent to form two pintle members, it may be formed with only one pintle member made long enough to properly hold the knuckle as shown in Fig. 7.

Also, the tubular knuckle has been described and illustrated as having two similar shaped ends each embodying a stop 10a and two recesses 11, 12 and a cam-like projection 13 between them. Only one end of the knuckle may be so formed, if desired, the other end being plain, or one recess 11 may be provided on one end only of the knuckle and a recess 12 provided on the other end only. Furthermore, the two recesses 11, 12, and the cam projection 13 may in some cases be dispensed with and the spring side members 4 of the ring may be depended upon to frictionally grip the ends of the knuckle so as to hold it in its adjusted positions. In that case the bearing faces 11a, 12a at the knuckle ends may be roughened to provide the requisite grip for the spring side members 4.

In the appended claims, I have pointed out the essential elements of my invention, it being understood, however, that the claims are not intended to be limited to the form of the parts illustrated and described further than a limitation to the described form is necessary to distinguish them from the prior art.

Having thus described my invention, what I claim and desire to secure by Letters Patent is:

1. An end ring for a tape, a hook thereon, said ring having side members normally spring-actuated toward each other and bent to present two opposed pintle members spaced apart, said hook including a tubular hinged knuckle receiving said pintle members, an end of said knuckle being formed to present a shoulder stop positioned to come into engagement with the top face of a side member when the hook is extended, and also formed to present two depressions, one of which is positioned to releasably engage said side member when the hook is in its folded position, the other depression positioned to engage the said side member in conjunction with said stop when the hook is extended, said hook having a cam-like projection on the end of the knuckle between said depressions, the side members of the ring being arranged to normally bear against the ends of said knuckle and to override said projection, for the purposes set forth.

2. In combination, a tape measure ring having the outer ends of its side members normally spring-actuated toward each other, at least one of said side members shaped to present a pintle, a hook including a tubular knuckle that receives said pintle and being of appropriate length to hold said yieldable side members in outwardly sprung position, a shoulder extending from an end of said knuckle and positioned to stop against a face of the ring when the hook is in its outwardly projecting working position, said knuckle being frictionally engaged between the side members of said ring to releasably hold the hook in its extended position, or in its folded position.

In testimony whereof, I affix my signature.
ROBERT G. THOMPSON.